United States Patent
Tomaszewski et al.

(10) Patent No.: US 11,028,870 B2
(45) Date of Patent: Jun. 8, 2021

(54) HYBRID THREE-POINT DRIVE FASTENER

(71) Applicant: MacLean-Fogg Company, Mundelein, IL (US)

(72) Inventors: Steven J. Tomaszewski, Lake Zurich, IL (US); Duncan A. MacLean, Lake Forest, IL (US); Larry J. Wilson, Commerce Township, MI (US)

(73) Assignee: MACLEAN-FOGG COMPANY, Mundelein, IL (US)

( * ) Notice: Subject to any disclaimer, the term of this patent is extended or adjusted under 35 U.S.C. 154(b) by 237 days.

(21) Appl. No.: 15/872,386

(22) Filed: Jan. 16, 2018

(65) Prior Publication Data
US 2019/0219089 A1    Jul. 18, 2019

(51) Int. Cl.
*F16B 23/00* (2006.01)

(52) U.S. Cl.
CPC ........ *F16B 23/0038* (2013.01); *F16B 23/003* (2013.01); *F16B 23/0092* (2013.01); *F16B 23/0061* (2013.01)

(58) Field of Classification Search
CPC .......................... F16B 23/003; F16B 23/0092; F16B 23/0038; F16B 23/0061
USPC .......................................... 411/403, 410, 435
See application file for complete search history.

(56) References Cited

U.S. PATENT DOCUMENTS

| | | | |
|---|---|---|---|
| 2,248,695 A | | 7/1941 | Bradshaw |
| 2,969,250 A | | 1/1961 | Kull |
| 3,003,379 A | * | 10/1961 | Pribitzer ................. B25B 13/08 81/119 |
| 3,277,942 A | * | 10/1966 | Marion ................. F16B 39/284 411/284 |
| 3,396,765 A | | 8/1968 | Ridenour |
| 3,400,626 A | * | 9/1968 | Bergere ................. B25B 15/005 411/405 |
| 3,456,548 A | | 7/1969 | Schmidt et al. |
| 3,584,667 A | | 6/1971 | Reiland |
| 3,885,480 A | | 5/1975 | Muenchinger |
| 4,006,660 A | | 2/1977 | Yamamoto et al. |
| 4,260,005 A | | 4/1981 | Stencel |
| 4,361,412 A | * | 11/1982 | Stolarczyk .......... F16B 23/0007 411/402 |
| 4,459,074 A | | 7/1984 | Capuano |
| 4,938,731 A | | 7/1990 | Nguyen et al. |
| 5,019,080 A | | 5/1991 | Hemer |
| 5,378,101 A | | 1/1995 | Olson et al. |

(Continued)

FOREIGN PATENT DOCUMENTS

DE    203 21 249 U1    10/2006
EP    0 926 362 A1    6/1999

(Continued)

OTHER PUBLICATIONS

Extended European Search Report for European Application No. 19151847.1 dated Jun. 5, 2019 (7 pages).

(Continued)

*Primary Examiner* — Flemming Saether
(74) *Attorney, Agent, or Firm* — Brooks Kushman P.C.

(57) ABSTRACT

Fasteners are disclosed for use with multiple standard torque delivery tools. The fasteners include several different torque bearing portions for use with different torque delivery tools, as well as non-torque bearing portions disposed between torque bearing portions.

18 Claims, 10 Drawing Sheets

(56) References Cited

U.S. PATENT DOCUMENTS

| | | |
|---|---|---|
| 5,577,871 A | 11/1996 | Brugola |
| 5,674,036 A | 10/1997 | Hsieh |
| 6,343,531 B2 | 2/2002 | Amis |
| 6,632,057 B1 | 10/2003 | Fauchet |
| 6,655,888 B2 | 12/2003 | Schultz |
| 6,736,580 B2 | 5/2004 | Schultz |
| 7,073,416 B2 | 7/2006 | Kozak et al. |
| 7,108,510 B2 | 9/2006 | Niznick |
| 7,128,513 B2 | 10/2006 | Walker |
| 7,207,248 B2 | 4/2007 | Panasik et al. |
| 7,225,710 B2 | 6/2007 | Pacheco, Jr. |
| 7,331,743 B2 | 2/2008 | Schultz |
| 7,331,744 B2 | 2/2008 | Schultz |
| 7,568,872 B2 | 8/2009 | Schultz |
| 7,857,563 B2 | 12/2010 | Pratt |
| 8,291,795 B2 | 10/2012 | Hughes et al. |
| 8,429,875 B2 | 4/2013 | Bartlett |
| 8,454,288 B2 * | 6/2013 | Hui .................... F16B 23/0038 411/402 |
| 8,616,097 B2 | 12/2013 | Hughes et al. |
| 8,747,044 B2 | 6/2014 | Garver |
| 8,997,608 B2 | 4/2015 | Merrick |
| 9,138,873 B2 | 9/2015 | Merrick |
| 9,278,434 B2 | 3/2016 | Merrick |
| 9,624,962 B2 * | 4/2017 | Unseld ................... B21H 3/08 |
| 9,644,660 B2 | 5/2017 | Garver |
| 9,662,775 B2 | 5/2017 | Merrick |
| 9,868,188 B2 | 1/2018 | Merrick |
| 9,957,993 B2 | 5/2018 | Pritchard |
| 9,964,133 B2 | 5/2018 | Bjelobradic et al. |
| 10,071,466 B2 * | 9/2018 | Wilson ................. B25B 21/002 |
| 2003/0044257 A1 | 3/2003 | Siegel et al. |
| 2003/0158555 A1 | 8/2003 | Sanders et al. |
| 2006/0062650 A1 | 3/2006 | Keener |
| 2006/0266168 A1 | 11/2006 | Pacheco, Jr. |
| 2009/0220321 A1 | 9/2009 | Sakamura |
| 2009/0285653 A1 | 11/2009 | Schultz |
| 2013/0286668 A1 | 10/2013 | Ishida et al. |
| 2015/0343615 A1 | 12/2015 | Merrick |
| 2016/0131170 A1 | 5/2016 | Landsmann |
| 2016/0252125 A1 | 9/2016 | Lares |
| 2016/0273591 A1 | 9/2016 | Goss |
| 2016/0312816 A1 | 10/2016 | Bjelobradic et al. |
| 2017/0050300 A1 | 2/2017 | Lukes et al. |
| 2018/0003241 A1 | 1/2018 | Goss |
| 2018/0193986 A1 | 7/2018 | Tissieres |
| 2018/0298933 A1 | 10/2018 | Wilson et al. |

FOREIGN PATENT DOCUMENTS

| | | |
|---|---|---|
| EP | 0 961 042 A1 | 12/1999 |
| EP | 1 162 376 | 12/2001 |
| EP | 1 632 683 | 3/2006 |
| EP | 2 022 992 | 2/2009 |
| EP | 2 363 245 | 9/2011 |
| EP | 1 765 214 | 5/2016 |
| EP | 3 115 153 | 1/2017 |
| EP | 3 388 694 | 10/2018 |
| FR | 2 361 568 | 3/1978 |
| GB | 1 564 684 | 2/1978 |
| WO | WO 2003/062650 | 7/2003 |
| WO | WO 2003/068093 | 8/2003 |
| WO | WO 2004/005731 | 1/2004 |
| WO | WO 2005/082641 A1 | 9/2005 |
| WO | WO 2006/130490 | 12/2006 |
| WO | WO 2010/014881 | 2/2010 |
| WO | WO 2015/086196 | 6/2015 |
| WO | WO 2016/149526 | 9/2016 |

OTHER PUBLICATIONS

"Torx Plus Drive System;" Infastech Intellectual Properties Pte. Ltd.; 2011; 15p; Decorah, IA.

Rudd, Matthew; Patentability Search for "Hybrid 6-Lobe—Hex Nut/Bolt;" Cardinal Intellectual Property; Nov. 23, 2016; 11p; Evanston, IL.

* cited by examiner

PRIOR ART

PRIOR ART

HYBRID THREE-POINT DRIVE FASTENER

BACKGROUND

The present invention relates generally to fasteners and more particularly to a hybrid three-point drive fastener for transmitting torque from a tool to the fastener.

Fasteners are used in numerous applications to join components together. Typically, a fastener has at least a threaded portion and a bearing portion with one or more bearing surfaces attached to the threaded portion. The bearing portion is designed to receive torque from a tool, such as a socket or wrench, which is used to tighten or loosen the fastener. In a conventional fastener, such as a nut, the fastener may have internal threads and six bearing surfaces oriented in a hexagon shape around the internal threads. However, other fasteners may have external threads, such as bolts and screws. Some tools to apply torque to threaded fasteners are six-point hexagon or twelve-point hexagon-like geometry sockets and six-lobe or enhanced six-lobe (also known as hexalobular, Torx®, or star) sockets.

Figure 1:
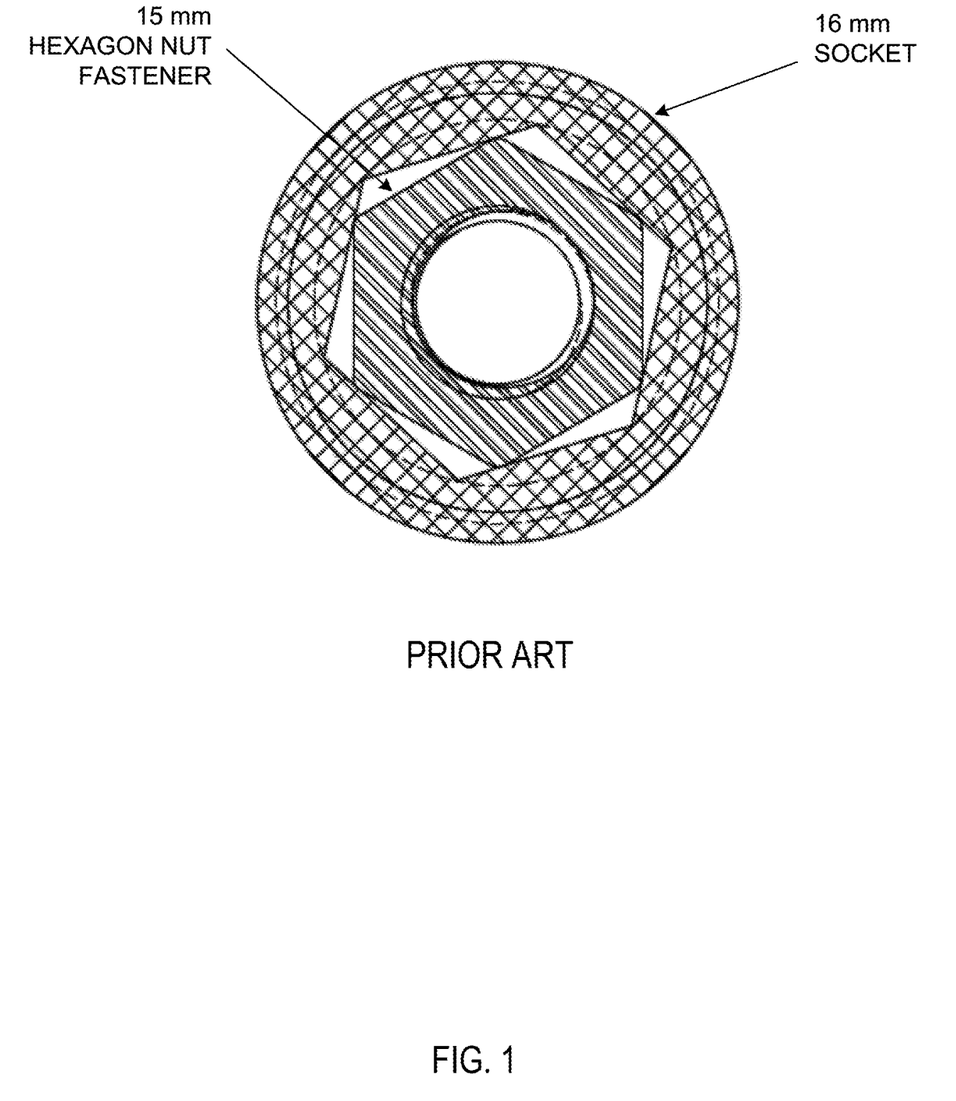
FIG. 1 is a top view of a prior technology hexagon nut and socket.

In order to mistake-proof a joint assembly process by preventing an incorrect fastener being used in a critical joint application, a manufacturer will typically oversize the hexagon bearing portion of the correct fastener and supply the assembly operator with a socket that matches the oversized hexagon bearing portion. This decreases the likelihood that an incorrect fastener, with a standard sized bearing portion, will be used during assembly. For example, the correct nut for a joint assembly may have a 16 mm hexagon bearing portion, whereas a standard M10 nut has a 15 mm hexagon bearing portion. The assembly operator would have a 16 mm hexagon socket to install the correct nut. The 16 mm hexagon socket would not fit well on the incorrect M10 nut, which decreases the likelihood of the operator using the incorrect M10 nut. However, this typical practice of oversizing the bearing portion of the correct fastener has disadvantages. First, the correct fastener will weigh more due to the extra material in the oversized bearing portion. For example, the weight of a hexagon flange nut increases by approximately 12% by designing the nut with a larger hexagon bearing portion. Second, the correct fastener will cost more due to the extra material in the oversized bearing portion. For example, the cost of a hexagon flange nut with a larger hexagon bearing portion is 12% higher or more due to higher material costs, heat treating costs, plating costs, and packaging costs. Third, it is still possible for the assembly operator to install the incorrect fastener (with a standard sized bearing portion) with the larger, correct socket. For example, FIG. 1 shows that a 16 mm hexagon socket can drive a nut with a 15 mm hexagon bearing portion.

In the fastener industry there is a growing need to mistake-proof assembly processes in order to improve efficiency and reduce costs. There is also a trend towards decreasing the weight of fasteners to increase gas mileage of combustion driven vehicles and battery life of electric driven vehicles. Also, some mechanics may not have the special tools needed to remove all the fasteners with non-standard bearing portion shapes and features.

SUMMARY

In one embodiment, a fastener comprises a threaded portion and a first bearing portion designed to receive torque from a first tool and transmit torque to the threaded portion. The first bearing portion comprises three pairs of first bearing surfaces, where each pair of first bearing surfaces is equally spaced apart from each other pair of first bearing surfaces. The fastener also comprises a second bearing portion designed to receive torque from a second tool and transmit torque to the threaded portion. The second bearing portion comprises six concave bearing surfaces. Each pair of the first bearings surfaces is disposed between two of the concave bearing surfaces. The fastener also comprises a non-bearing portion. The non-bearing portion comprises three convex non-bearing surfaces, where each convex non-bearing surface is disposed between two of the pairs of first bearing surfaces and between two of the concave bearing surfaces.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE DRAWINGS

Figure 2:
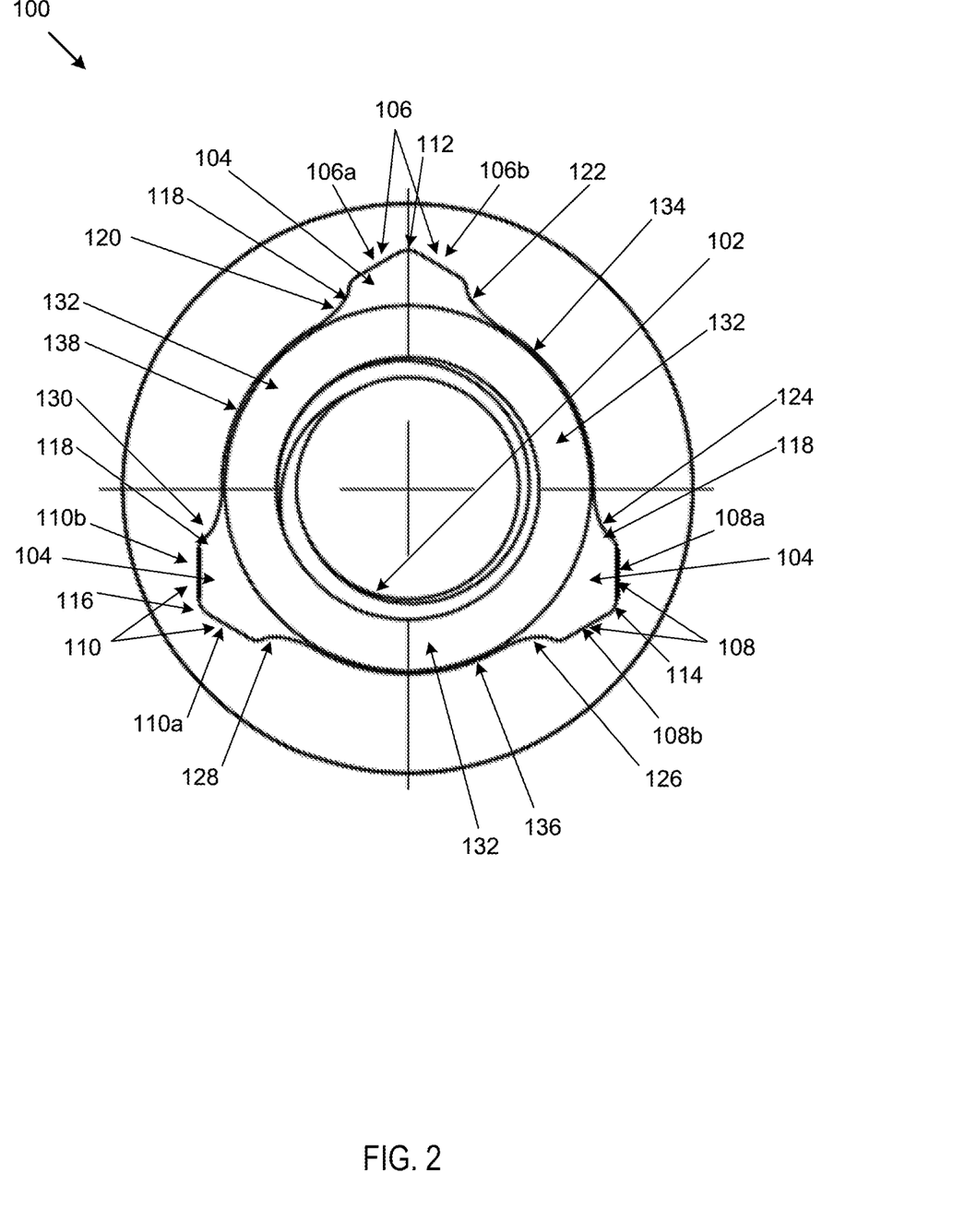
FIG. 2 is a top view of a fastener according to an embodiment of this disclosure.

Referring now to the figures, FIG. 2 shows an embodiment of a hybrid three-point drive fastener. Fastener 100 has a threaded portion 102. Threaded portion 102 may surround an opening extending along the axial length of fastener 100 (into the page of FIG. 2). Fastener 100 may be a nut or any other fastener with internal threads.

Fastener 100 may include a first torque bearing portion 104. The torque bearing portion 104 may extend the entire axial length of fastener 100 or may only extend along part of the axial length of fastener 100. Bearing portion 104 may include three pairs of torque bearing surfaces 106, 108, 110 that may be designed to receive torque from a tool, such as a six-point hexagon socket, twelve-point hexagon-like geometry socket, or wrench, and transmit torque to the threaded portion 102.

Each pair of torque bearing surfaces 106, 108, 110 may include two torque bearing sides with an edge 112, 114, 116 between the sides. Torque bearing surface 106 may include torque bearing sides 106a and 106b with edge 112 between the sides. Torque bearing surface 108 may include torque bearing sides 108a and 108b with edge 114 between the sides. Torque bearing surface 110 may include torque bearing sides 110a and 110b with edge 116 between the sides. The height of each torque bearing side 106a, 106b, 108a, 108b, 110a, 110b may be the height of the bearing portion 104 in an axial direction. Each torque bearing side 106a, 106b, 108a, 108b, 110a, 110b may be designed to receive torque from a tool, such as a hexagon socket or wrench, and transmit torque to the threaded portion 102 depending if the tool is tightening or loosening fastener 100. For example, if the tool is tightening fastener 100, torque bearing sides 106a, 108a, 110a may receive torque from the tool and transfer the torque to the threaded portion 102. Whereas if the tool is loosening fastener 100, torque bearing sides 106b, 108b, 110b may receive torque from the tool and transfer the torque to the threaded portion 102. The torque bearing side that receives and transfers torque when fastener 100 is being tightened or loosened may be switched depending on the direction of the threads in threaded portion 102.

Edges 112, 114, 116 may extend the entire axial length of bearing portion 104. Edges 112, 114, 116 may be located at the mid-point of torque bearing surface 106, 108, 110, respectively, such that the widths of each corresponding torque bearing side 106a, 106b, 108a, 108b, 110a, 110b are the same. For example, the widths of torque bearing sides 106a and 106b may be the same. Alternatively, the widths of any or all of the torque bearing sides may be different than any or all of the other torque bearing sides.

Fastener 100 may be designed and shaped to be driven by standard socket tools, such as a hexagon socket or a 12 point configuration socket. Accordingly, the angle at edges 112, 114, 116 where the torque bearing sides intersect may be approximately 120 degrees to match the angle of a standard six-point hexagon or twelve-point hexagon-like geometry sockets. Additionally, the edges 112, 114, 116 may be approximately equally spaced around the longitudinal axis of fastener 100 to match a standard six-point hexagon or twelve-point hexagon-like geometry sockets.

Fastener 100 may include a second torque bearing portion 118. The torque bearing portion 118 may extend the entire axial length of fastener 100 or may only extend along part of the axial length of fastener 100. Bearing portion 118 may include six torque bearing surfaces 120, 122, 124, 126, 128, 130 that may be designed to receive torque from a tool, such as a six-lobe or enhanced six-lobe socket, and transmit torque to the threaded portion 102. Bearing surfaces 120, 122, 124, 126, 128, 130 may be a concave shape in order to fit the lobes of a six-lobe or enhanced six-lobe socket. The height of each torque bearing surfaces 120, 122, 124, 126, 128, 130 may be the height of the bearing portion 118 in an axial direction.

Each torque bearing surfaces 120, 122, 124, 126, 128, 130 may be designed to receive torque from a tool, such as a six-lobe or enhanced six-lobe socket, and transmit torque to the threaded portion 102 depending if the tool is tightening or loosening fastener 100. For example, if the tool is tightening fastener 100, torque bearing surfaces 120, 124, 128 may receive torque from the tool and transfer the torque to the threaded portion 102. Whereas if the tool is loosening fastener 100, torque bearing surfaces 122, 126, 130 may receive torque from the tool and transfer the torque to the threaded portion 102. The torque bearing surface that receives and transfers torque when fastener 100 is being tightened or loosened may be switched depending on the direction of the threads in threaded portion 102.

Fastener 100 may include a non-torque bearing portion 132. Non-torque bearing portion 132 may include three non-torque bearing surfaces 134, 136, 138. The non-torque bearing surfaces 134, 136, 138 may not be intended to receive and transfer torque from a tool to the threaded portion 102. The non-torque bearing surfaces 134, 136, 138 may, however, incidentally receive and transfer torque from a tool to the threaded portion 102 even if the non-torque bearing surfaces 134, 136, 138 are not intended to do so.

The non-torque bearing portion 132 may be a convex shape. The wall thickness of non-torque bearing portion 132 between threaded portion 102 and non-torque bearing surfaces 134, 136, 138, respectively, may be uniformly thick (excluding the thickness of the threads) and sufficient to support the threads in threaded portion 102.

The non-torque bearing surfaces 134, 136, 138 and torque bearing surfaces 106, 108, 110 may be located adjacent to and between the torque bearing surfaces 120, 122, 124, 126, 128, 130, as shown in FIG. 2, such that torque bearing surface 120, 122, 124, 126, 128, 130 are not adjacent to each other.

Figure 3:
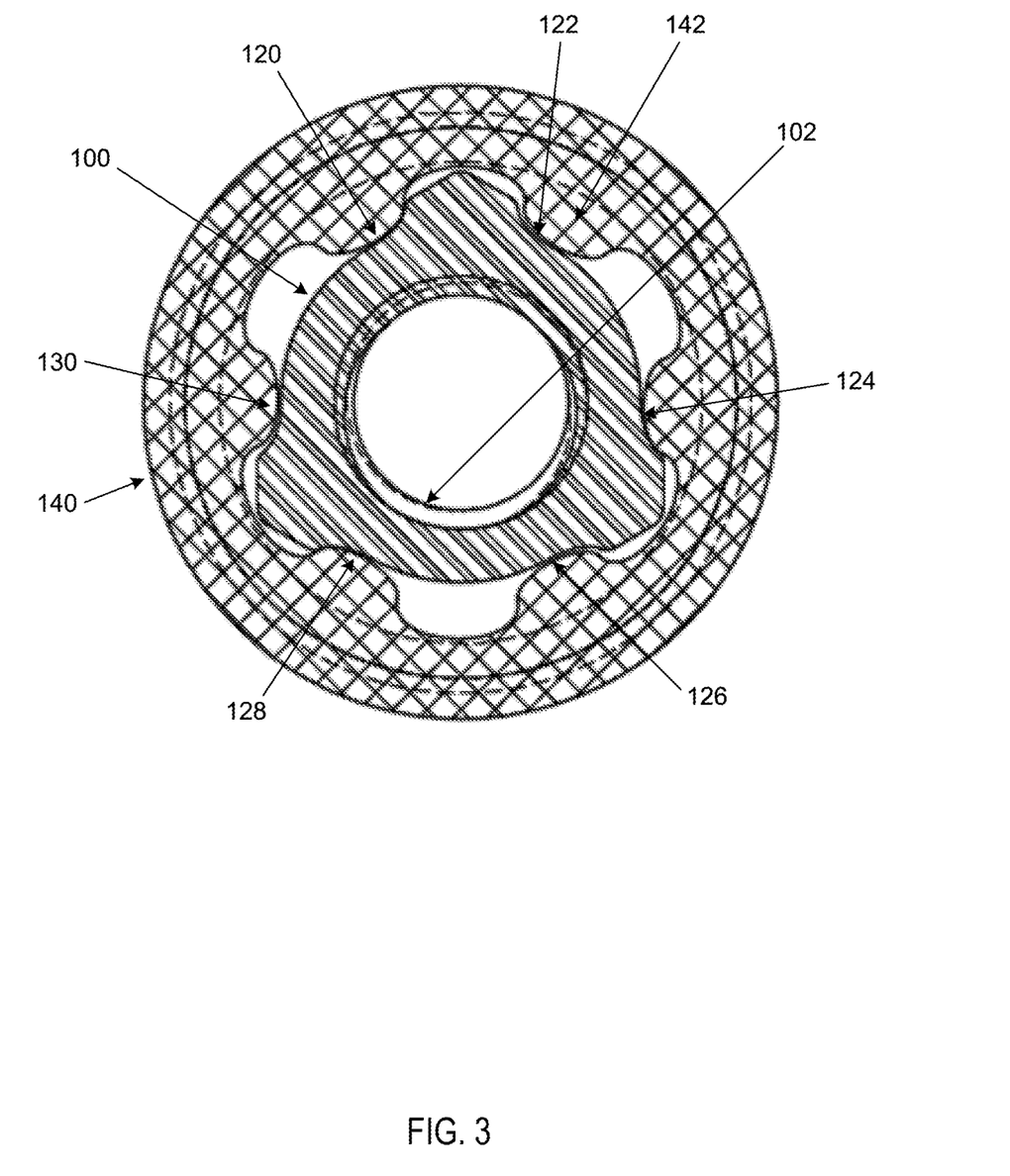
FIG. 3 is a top view of a fastener according to an embodiment of this disclosure and an enhanced six-lobe socket.

The hybrid three-point drive fastener, such as fastener 100, can be installed and removed with a standard enhanced six-lobe socket 140. FIG. 3 shows fastener 100 within a standard enhanced six-lobe socket 140. The lobes 142 of the standard enhanced six-lobe socket 140 contact torque bearing surfaces 120, 122, 124, 126, 128, 130 in order to transfer torque from the socket 140 to the threaded portion 102.

Figure 4:
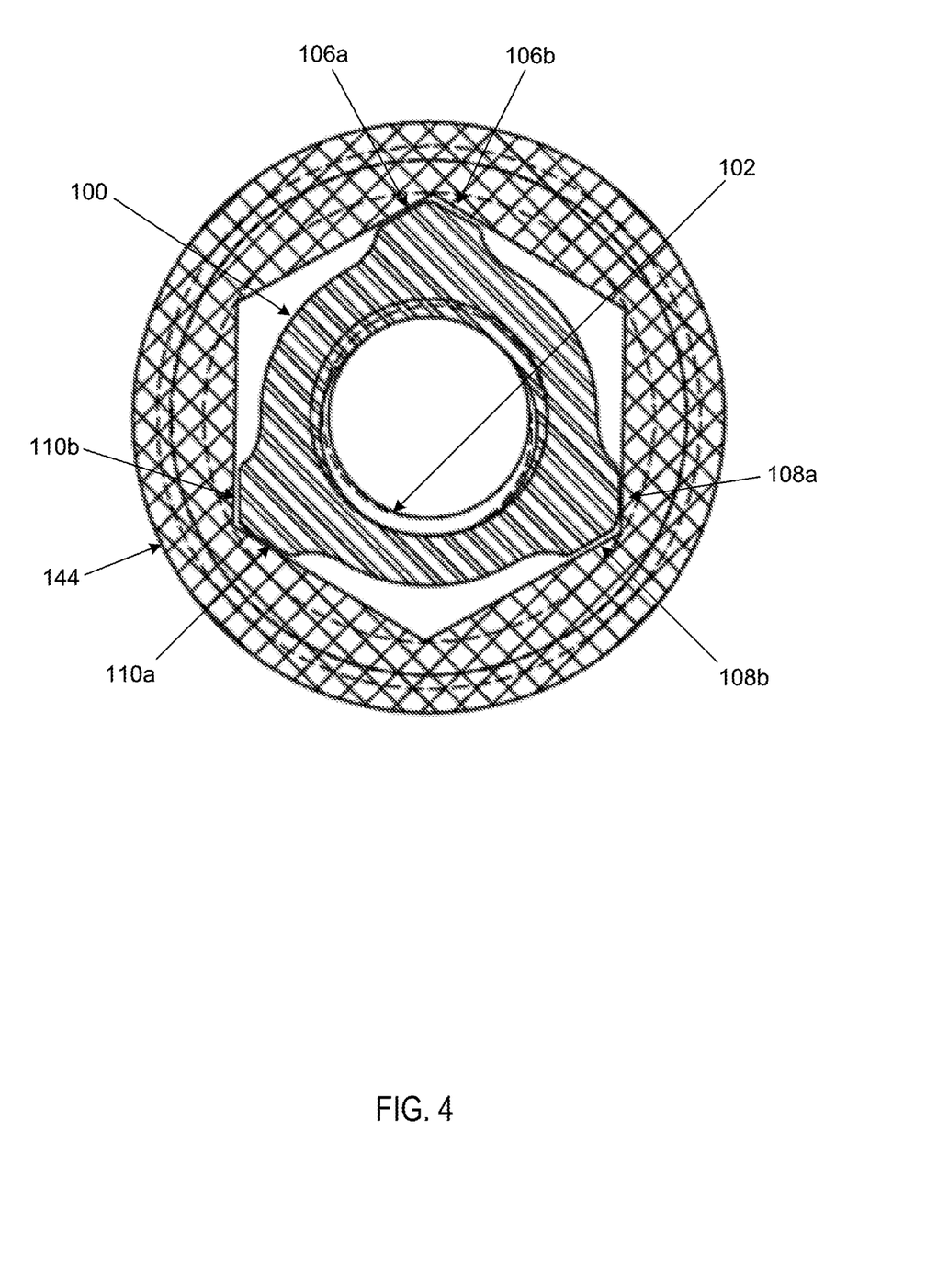
FIG. 4 is a top view of a fastener according to an embodiment of this disclosure and a six-point hexagon socket.
Figure 5:
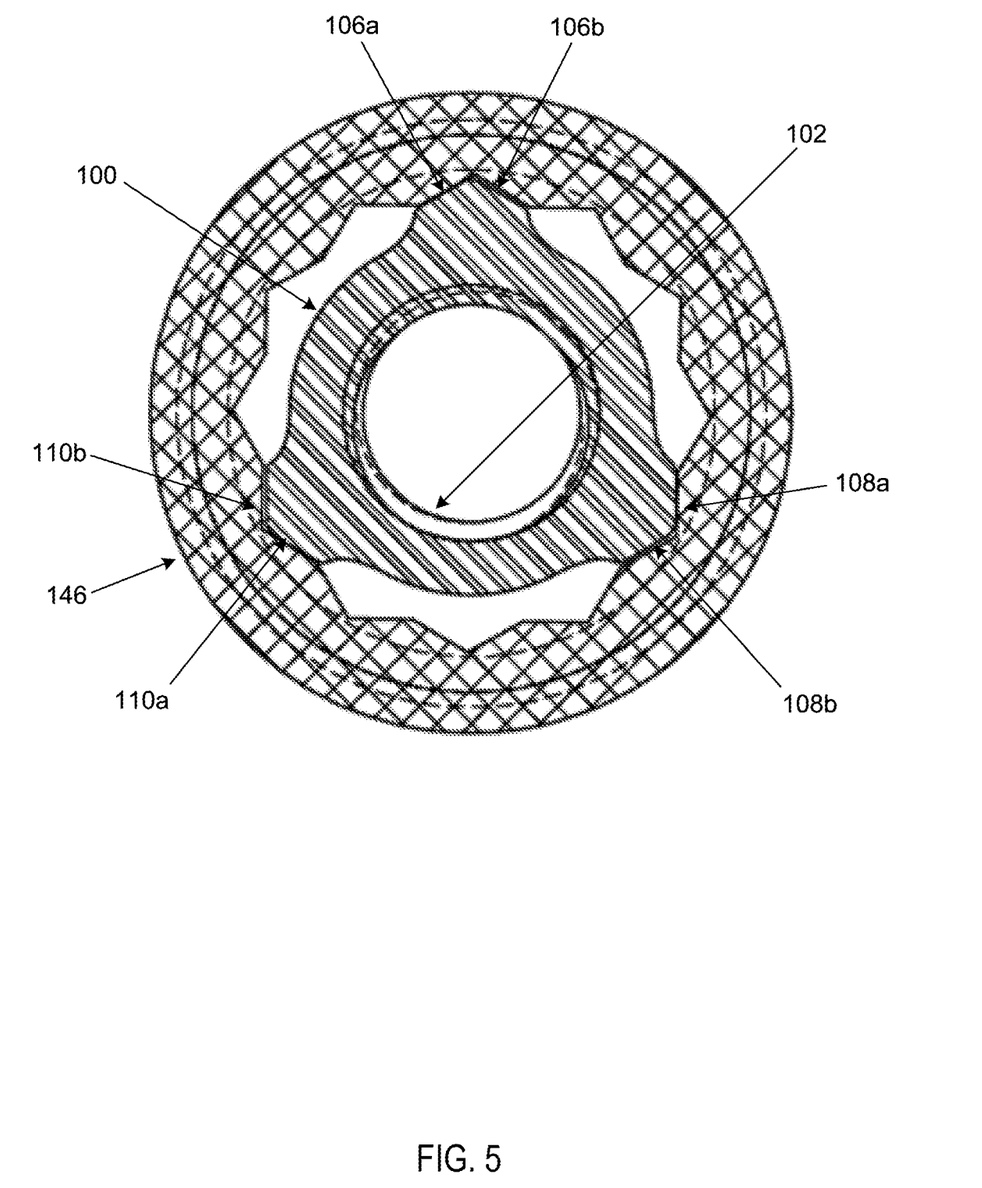
FIG. 5 is a top view of a fastener according to an embodiment of this disclosure and a twelve-point hexagon-like geometry socket.

The hybrid three-point drive fastener, such as fastener 100, can be removed in the field with a standard enhanced six-lobe socket 140 or standard six-point hexagon socket 144 or standard twelve-point hexagon-like geometry socket 146. Removal of the hybrid three-point drive fastener, such as fastener 100, with a standard six-point hexagon socket 144 or standard twelve-point hexagon-like geometry socket 146 is useful when the fastener needs to be removed for service and the operator does not have an enhanced six-lobe socket.

FIG. 4 shows fastener 100 within a standard six-point hexagon socket 144. The torque bearing sides 106a, 106b, 108a, 108b, 110a, 110b contact the hexagon sides of the standard six-point hexagon socket 144 in order to transfer torque from the socket 144 to the threaded portion 102. FIG. 5 shows fastener 100 within a standard twelve-point hexagon-like geometry socket 146. The torque bearing sides 106a, 106b, 108a, 108b, 110a, 110b contact the sides of the standard twelve-point hexagon-like geometry socket 146 in order to transfer torque from the socket 146 to the threaded portion 102.

Figure 6:
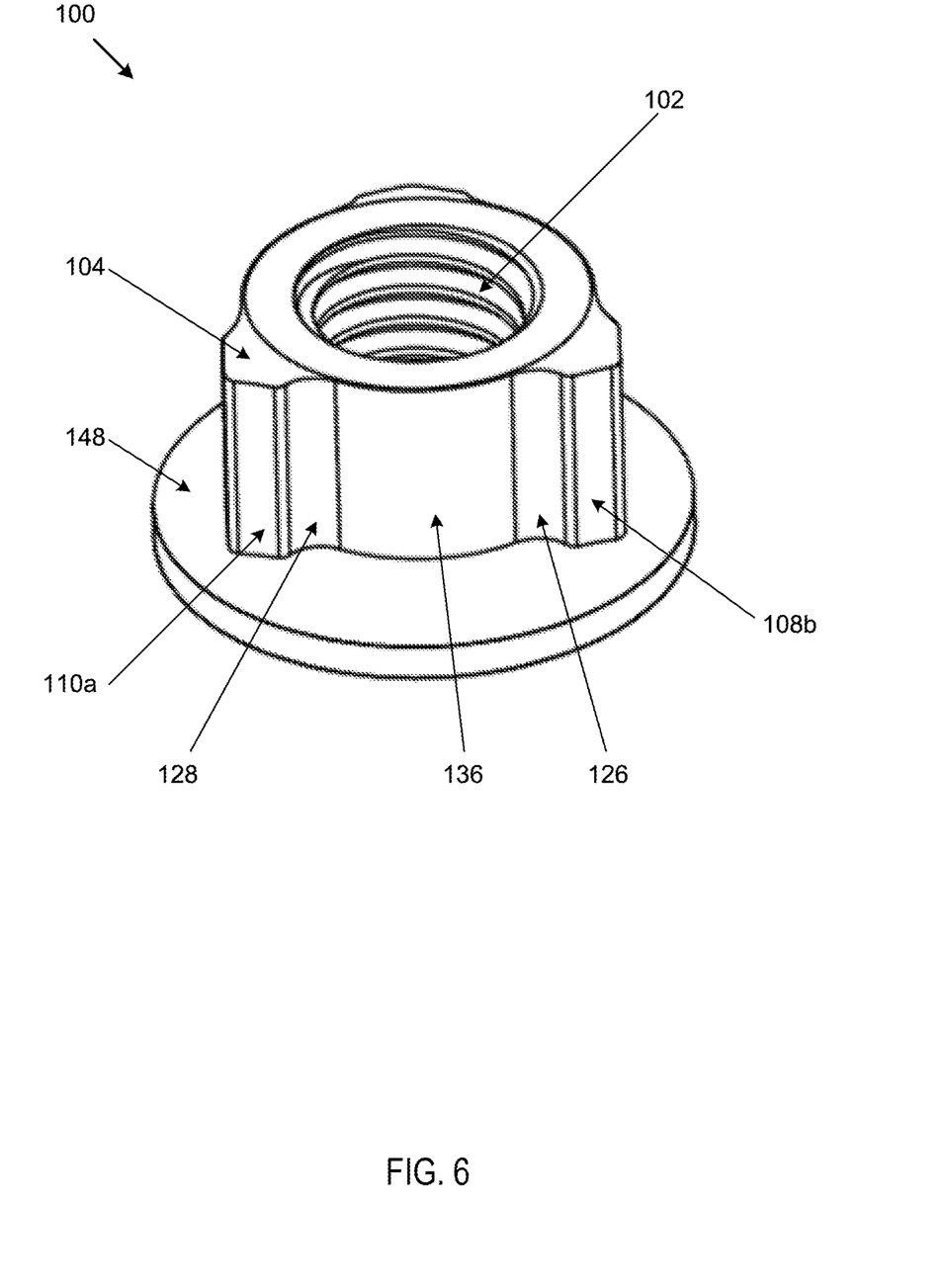
FIG. 6 is a perspective view of a fastener according to an embodiment of this disclosure.

FIG. 6 shows fastener 100 in a perspective view. Fastener 100 may include flange 148. Flange 148 may be designed to contact a tightening surface on an object (not shown) that fastener 100 is being tightened against. Flange 148 may extend beyond torque bearing portion 104. Flange 148 may distribute forces applied to the tightening surface.

Figure 7:
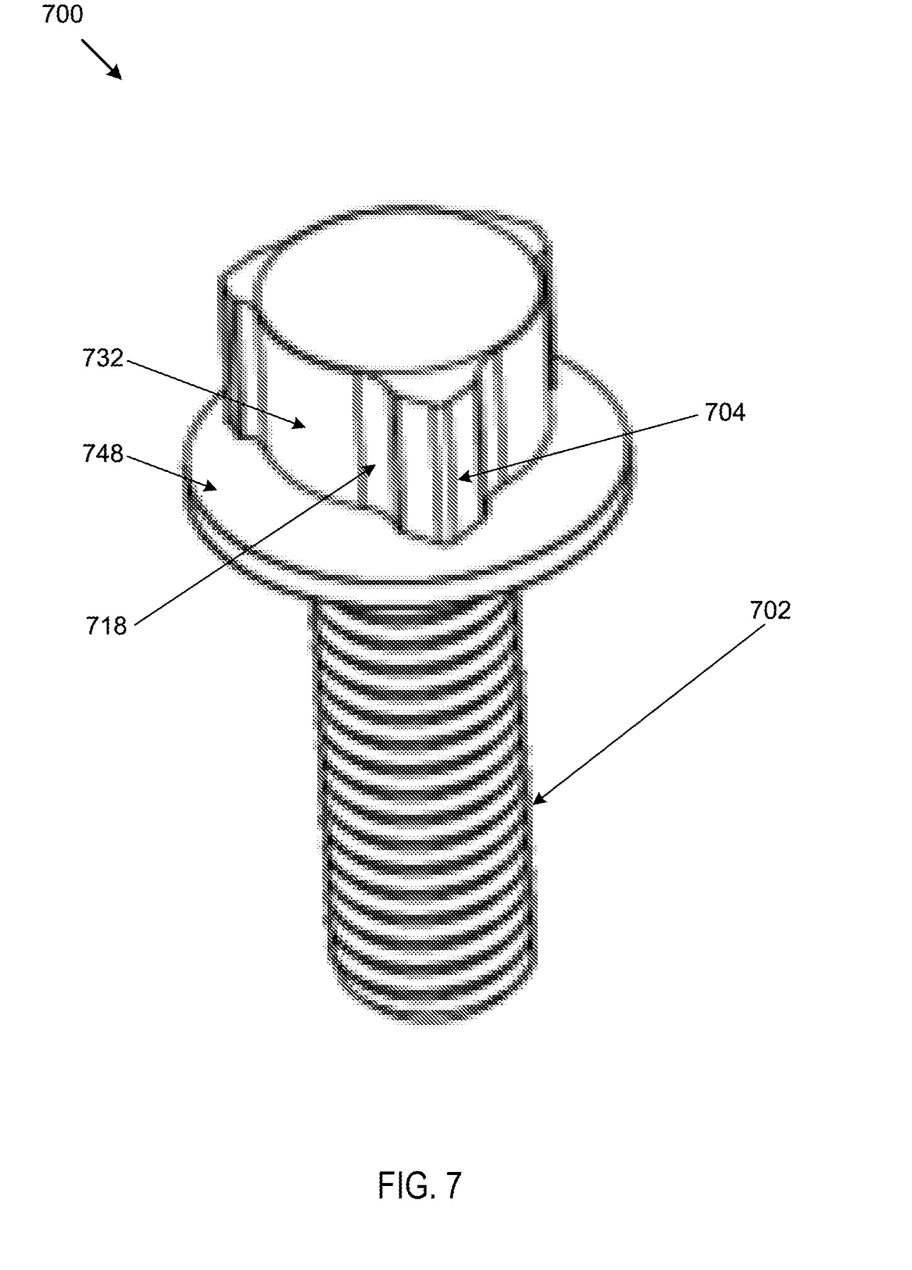
FIG. 7 is a perspective view of a fastener according to another embodiment of this disclosure.

FIG. 7 shows another embodiment of a hybrid three-point drive fastener. Fastener 700 may be a bolt fastener or any other fastener with external threads. Fastener 700 may have the same features and components as fastener 100 with the exception that threaded portion 702 on fastener 700 has exterior threads. Similar to fastener 100, fastener 700 may include a first torque bearing portion 704 with three pairs of torque bearing surfaces 706, 708, 710 that may be designed to receive torque from a tool, such as a six-point hexagon socket, twelve-point hexagon-like geometry socket, or wrench, and transmit torque to the threaded portion 702. Similar to fastener 100, fastener 700 may also include a second torque bearing portion 718 with six torque bearing surfaces 720, 722, 724, 726, 728, 730 that may be designed to receive torque from a tool, such as a six-lobe or enhanced six-lobe socket, and transmit torque to the threaded portion 702. Similar to fastener 100, fastener 700 may include a non-torque bearing portion 732 with three non-torque bearing surfaces 734, 736, 738 that may not be intended to receive and transfer torque from a tool to the threaded portion 702. Similar to fastener 100, fastener 700 can be installed and removed with a standard enhanced six-lobe socket 140. Similar to fastener 100, fastener 700 can be removed in the field with a standard enhanced six-lobe socket 140 or standard six-point hexagon socket 144 or standard twelve-point hexagon-like geometry socket 146. Fastener 700 may include flange 748 to contact a tightening surface on an object (not shown) that fastener 700 is being tightened against. Flange 748 may distribute forces applied to the tightening surface.

Figure 8:
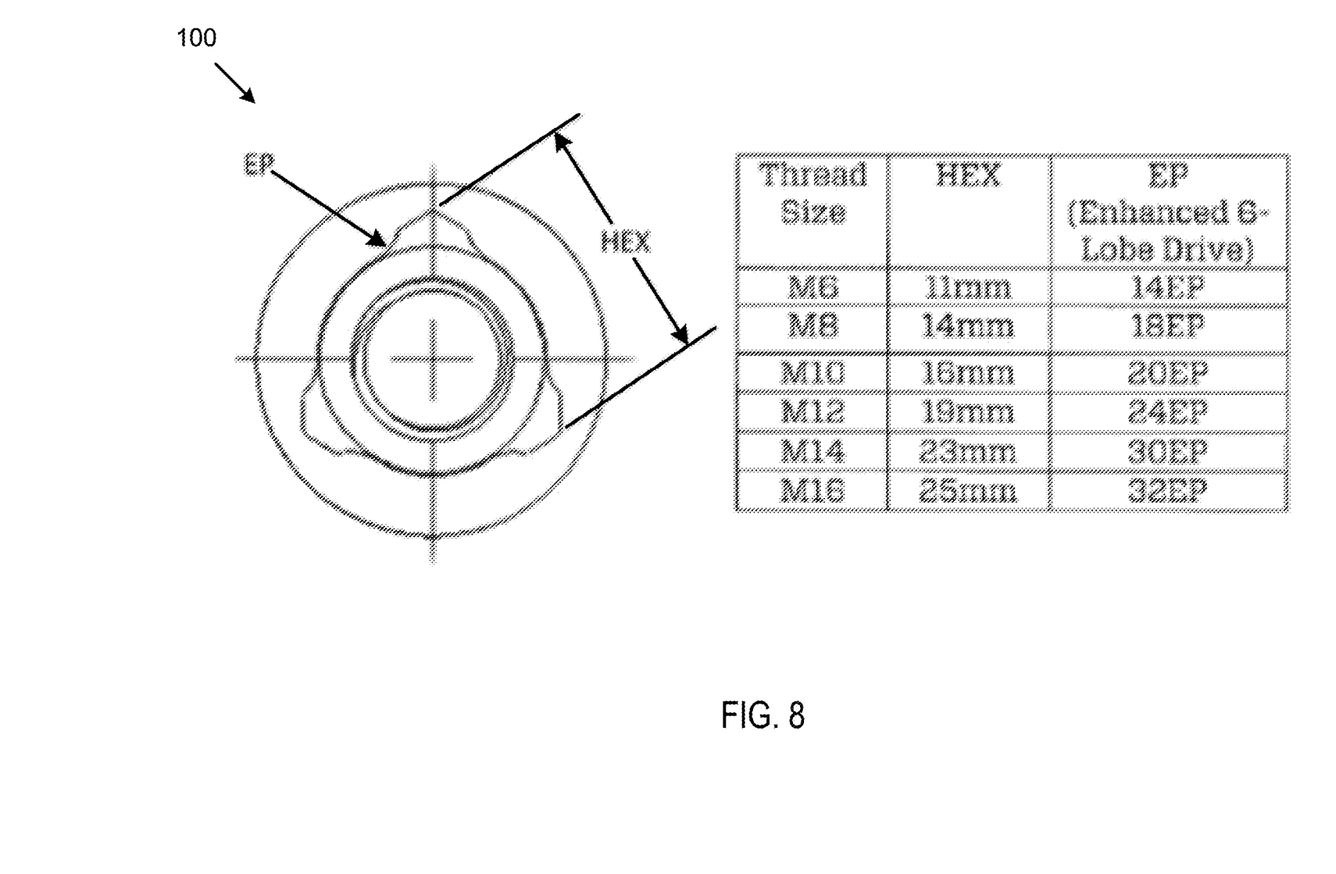
FIG. 8 is a top view of a fastener according to an embodiment of this disclosure and a table of corresponding exemplary tool sizes.

FIG. 8 shows exemplary tool sizes for a hybrid three-point drive fastener, such as fastener 100. For example, FIG. 8 shows that for fastener 100 with thread size M6, an 11 mm hexagon socket (HEX) or a 14 EP enhanced six-lobe socket can be used.

Figure 9:
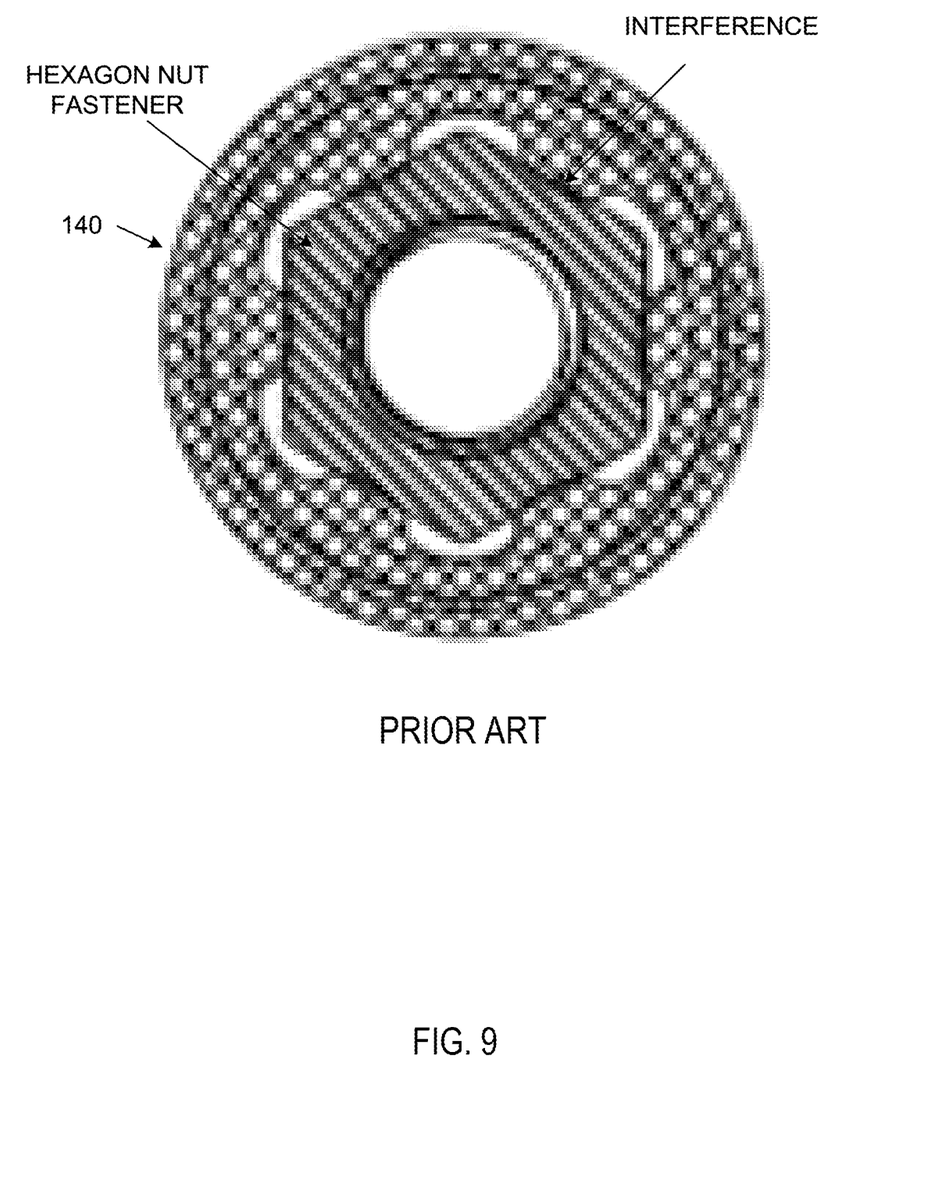
FIG. 9 is a top view of a prior technology hexagon nut and enhanced six-lobe socket.

Utilizing a hybrid three-point drive fastener may mistake-proof a joint assembly process by preventing an incorrect fastener being used. An assembly operator installing a hybrid three-point drive fastener can use an enhanced six-lobe socket to install the fastener, as discussed above. However, an incorrect hexagon fastener cannot be installed with an enhanced six-lobe socket because the hexagon fastener will not fit within the enhanced six-lobe socket. By using an enhanced six-lobe socket 140, the operator cannot inadvertently install a standard hexagon fastener. FIG. 9 shows that a standard hexagon nut fastener does not within a standard enhanced six-lobe socket 140. FIG. 9 shows that there would be interference between the hexagon nut fastener and the standard enhanced six-lobe socket 140.

Figure 10:
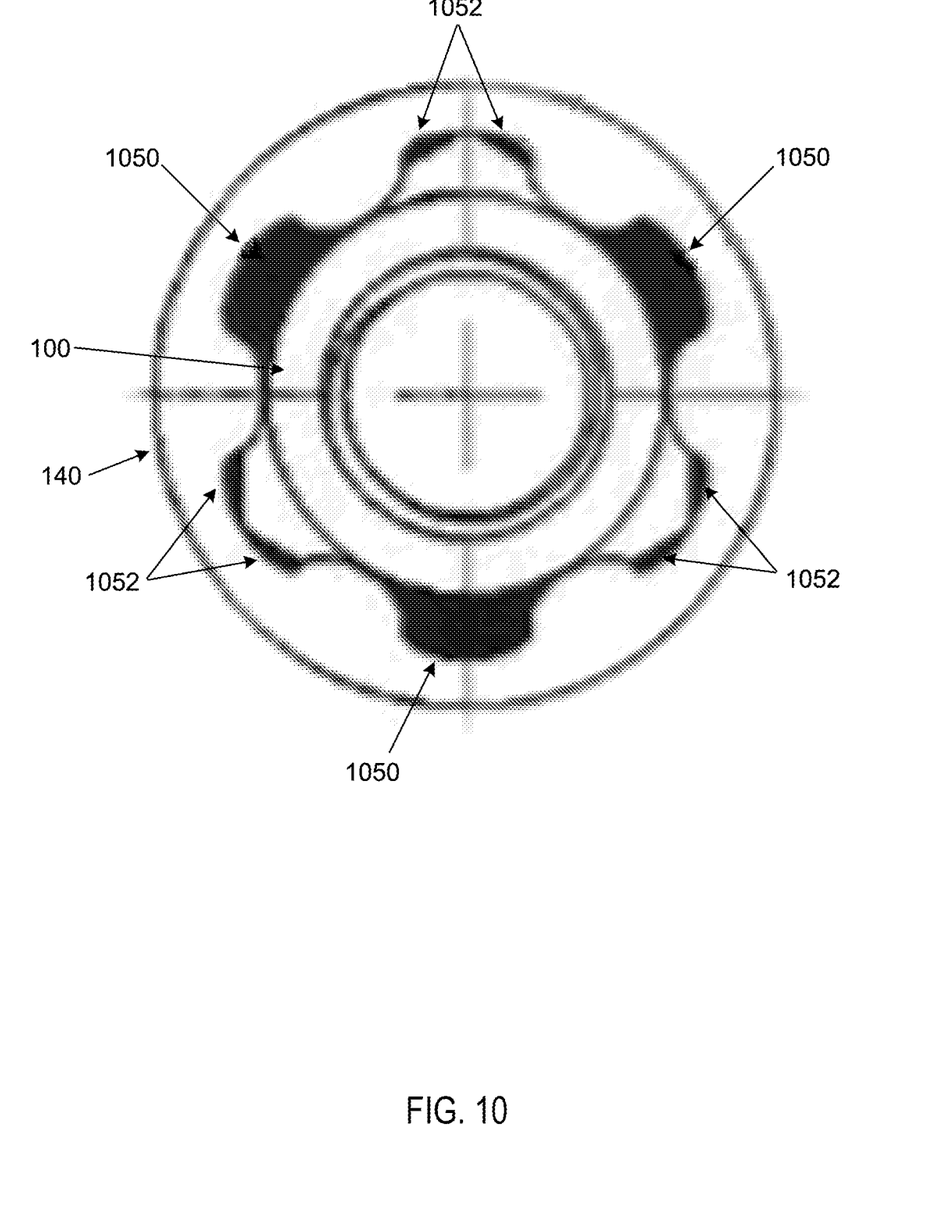
FIG. 10 is a top view of a fastener according to an embodiment of this disclosure and an enhanced six-lobe socket.

FIG. 10 shows fastener 100 within a standard enhanced six-lobe socket 140. The hybrid three-point drive fastener, such as fastener 100, reduces the weight and amount of material needed to produce the fastener, compared to a similarly sized standard fastener made of similar material. For example, fastener 100 weighs approximately 13% less than a standard enhanced six-lobe nut fastener. The weight reduction is accomplished by not including every other lobe 1050 that would be in the standard enhanced six-lobe fastener and not including end portions 1052 that would be included in the three remaining lobes of a standard enhanced six-lobe fastener. Fastener 100 also weighs approximately 6% less than a standard six-point hexagon nut fastener.

While several embodiments of the fastener has been described, it should be understood that the fasteners are not so limited, and modifications may be made without departing from the disclosures herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the fastener, and it is not necessarily expected that all of the described advantages will be achieved with every embodiment of the fasteners. The scope of the disclosure is defined by the appended claims, and all devices and methods that come within the meaning of the claims, either literally or by equivalence, are intended to be embraced therein.

The invention claimed is:

1. A fastener comprising:
a threaded portion;
a first bearing portion to receive torque from a first tool and transmit torque to the threaded portion, wherein the first bearing portion comprises exactly three pairs of first bearing surfaces, wherein each pair of first bearing surfaces is equally spaced apart from each other pair of first bearing surfaces;
a second bearing portion to receive torque from a second tool and transmit torque to the threaded portion, wherein the second bearing portion comprises exactly six concave bearing surfaces;
wherein each pair of the first bearings surfaces is disposed between two of the concave bearing surfaces; and
a non-bearing portion, wherein the non-bearing portion comprises three convex non-bearing surfaces, wherein each convex non-bearing surface separates two of the concave bearing surfaces,
wherein each concave bearing surface smoothly transitions to an adjacent non-bearing surface,
wherein one of the first bearing surfaces of each of the three pairs of first bearing surfaces is parallel to one other first bearing surface of one other of the three pairs of first bearing surfaces.

2. The fastener of claim 1, wherein a torque application portion of the first tool is shaped differently than a torque application portion of the second tool.

3. The fastener of claim 2, wherein the first tool is a six-point hexagon socket or a twelve-point socket, and wherein the second tool is a six-lobe socket.

4. The fastener of claim 1, wherein the six concave bearing surfaces are not adjacent to each other.

5. The fastener of claim 1, wherein each pair of first bearing surfaces is comprised of a first tightening surface and a first loosening surface, wherein the first tightening surfaces are designed to transmit torque in a tightening direction to the threaded portion and the first loosening surfaces are designed to transmit torque in a loosening direction to the threaded portion.

6. The fastener of claim 5, wherein the first tightening surface and the first loosening surface of each first bearing surface form an approximately 120 degree angle at an edge connecting the first tightening surface to the first loosening surface.

7. The fastener of claim 5, wherein each of the first tightening surfaces and the first loosening surfaces are substantially flat.

8. The fastener of claim 1, wherein one of the surfaces of each first pair of bearing surfaces is parallel to only one other surface of one other first pair of bearing surfaces.

9. The fastener of claim 1, wherein each of the concave bearing surfaces is formed between the adjacent non-bearing surface and one of the first bearing surfaces.

10. The fastener of claim 1, further comprising a flange disposed at an end of the first bearing portion and second bearing portion, wherein the flange extends radially beyond the first bearing portion.

11. The fastener of claim 1, further comprising an opening extending along an axial length of the fastener, wherein the threaded portion comprises internal threads on the opening.

12. The fastener of claim 11, wherein the wall thickness between the non-bearing surfaces and the base of the internal threads is at least half as thick as a distance between an outermost radial edge of the first bearing portion and the base of the internal threads.

13. The fastener of claim 11, wherein the fastener comprises approximately 13 percent less mass than a six-lobe nut fastener sized to receive the second tool.

14. The fastener of claim 1, wherein the threaded portion comprises external threads.

15. A fastener comprising:
   a threaded portion;
   a first bearing portion to receive torque from a first socket tool and transmit torque to the threaded portion, wherein the first bearing portion comprises exactly three pairs of first bearing surfaces;
   a second bearing portion to receive torque from a second socket tool and transmit torque to the threaded portion, wherein the second bearing portion comprises concave bearing surfaces;
   wherein each pair of the first bearings surfaces is disposed between two of the concave bearing surfaces; and
   three convex non-bearing surfaces wherein each convex non-bearing surface is disposed between two of the pairs of first bearing surfaces and between two of the concave bearing surfaces,
   wherein each concave bearing surface smoothly transitions to one adjacent non-bearing surface,
   wherein one of the first bearing surfaces of each of the three pairs of first bearing surfaces is parallel to one other first bearing surface of one other of the three pairs of first bearing surfaces.

16. A fastener comprising:
   a threaded portion;
   a fastener head having exactly three fastener points, each fastener point comprising;
      a first bearing portion to receive torque from a first tool and transmit torque to the threaded portion; and
      a second bearing portion defining a concave bearing surface to receive torque from a second tool and transmit torque to the threaded portion; and
   three convex non-bearing surfaces, wherein one of the non-bearing surfaces is disposed between each of the fastener points, each fastener point projecting beyond a periphery of the non-bearing surfaces, wherein each convex non-bearing surface separates two of the concave bearing surfaces,
   wherein each concave bearing surface smoothly transitions to an adjacent non-bearing surface,
   wherein the first bearing portion of each fastener point is parallel to one other bearing portion of one other fastener point.

17. The fastener of claim 16, wherein the fastener points are equally spaced apart from each other.

18. The fastener of claim 16, wherein the first bearing portion comprises a pair of first bearing surfaces, and
   the second bearing portion comprises a pair of concave bearing surfaces,
   wherein each pair of first bearing surfaces is disposed between the two concave bearing surfaces.

* * * * *